Inventors,
Herbert Töpfer,
Erich Ehricke,
Alois Brandstetter, &
Alfons Peissner.
By. [signature] Atty.

Inventors:
Herbert Töpfer,
Erich Ehricke,
Alois Brandstetter, &
Alfons Peissner.
By [signature] Atty.

Aug. 20, 1957 H. TÖPFER ET AL 2,803,705

DISTRICT SWITCHING CIRCUITS FOR TELEPHONE SYSTEMS

Filed Dec. 17, 1951 4 Sheets-Sheet 3

Inventors.
Herbert Töpfer,
Erich Ehricke,
Alois Brandstetter, &
Alfons Beissner.

By [signature] Atty.

DISTRICT SWITCHING CIRCUITS FOR TELEPHONE SYSTEMS

Filed Dec. 17, 1951 4 Sheets-Sheet 4

INVENTORS
Herbert Töpfer
Erich Ehricke
Alois Brandstetter
Alfons Peissner
BY
ATTORNEY

United States Patent Office 2,803,705

Patented Aug. 20, 1957

2,803,705

DISTRICT SWITCHING CIRCUITS FOR TELEPHONE SYSTEMS

Herbert Töpfer, Erich Ehricke, Alois Brandstetter, and Alfons Peissner, Munich, Germany, assignors to Siemens & Halske Aktiengesellschaft, Munich and Berlin, Germany, a corporation of Germany Application December 17, 1951, Serial No. 262,002

Claims priority, application Germany December 20, 1950

4 Claims. (Cl. 179—18)

This invention is concerned with district switching circuits for telephone systems.

In telephone systems in which the subscribers can dial long distance over large territories, for example, over an entire country, there are connections set up over several regional networks of different classes or network planes. Included in these is a class which comprises exchanges functioning as the central switching offices of regional groups. The next higher plane or class comprises main exchanges, and the top class or plane finally includes the transit toll exchanges or central exchanges of the corresponding districts. The connections are established over the various networks by means of district numbering schemes which secure the uniform numbering of all local exchanges. The main or principal guiding paths for the setting up of connections which are determined by the district numbers are not always the shortest and therefore the most economical paths over which the connections can be established. Routing methods are therefore used to utilize the available interchange trunking paths or detouring trunks in addition to the direct trunks between the individual central exchanges of the network groups.

There is a routing or detouring operation known in which a call originating in a local exchange is responsive to dialling of a toll-discriminating number routed over switches in the individual network switching offices and switched through to the central exchange. This path may then be released responsive to the dialling of a direction-determining number, and the connection may be switched over a direct interexchange trunk to the exchange which is nearest to the called party. This operation entails temporary seizure of trunks and switching equipment which may in part be very valuable.

In order to avoid such temporary seizures, it has been proposed to provide in all switching exchanges impulse repeaters which operate responsive to receipt of the directional number to switch the routing switches to an idle interoffice trunk or regular direct trunk, and which repeat the directional number so as to set the successive switches. Some of the digits of the directional numbers, which are not needed, may in this procedure be absorbed.

The operation indicated in the preceding paragraph avoids temporary seizure of the usually high-grade (four-conductor) trunk lines and switches, but it causes delays which may be considerable. It also requires considerable expenditures, due to the necessity of providing impulse repeaters in all exchanges.

A system has become known (paper published in "Fernmeldetechnische Zeitschrift," Oct. 1950, No. 10, pp. 365–371, entitled "Ein Fernwahlsystem mit Richtungsvorwahl"), the title of this paper meaning "A Toll Selection System with Directional Preselection", which proposes to completely avoid temporary seizures as well as to reduce the expenditures in impulse repeaters. This system provides storage-repeaters merely in the network group center points of the local exchanges of a district, which are the switching points of the toll call-originating exchanges. These storage-repeaters alter the district number dialled by the calling party and transmit a multi-digit preselection number prefixed to the district number to cause the setting up of the toll call stage by stage over the regular trunk paths, provided that no interoffice trunks are available. If an idle interoffice trunk is found by the routing switches controlled by the preselection digits, which leads to the network area of the called subscriber, the storage-repeater which is controlled by checking impulses skips the digits of the preselection number which are not required and transmits the necessary digits of the district number. After connection is in this manner established with the terminal exchange designated by the corresponding district number, the calling party receives from this terminal exchange a signal indicating that he may now dial the called subscriber's local number.

A disadvantage of this known system resides in the central location of the storage-repeater devices, that is, the location thereof as common devices for several routing switches in the corresponding switching exchanges. These storage-repeater devices are usually provided in limited numbers, and waiting intervals therefore result until one or the other device becomes available for receiving impulses, thus representing potential points of congestion.

Another disadvantage resides in the following situation: The setting of the directional switches in the individual network exchange switching offices must be carried out by digit sequence (the preselection number) which is produced by the storage-repeater device located in the call-originating exchange and which is entirely different from the impulse sequence of the dialled district number. This means that all possible interoffice directions, which may be reached in setting up a given call, are numerically occupied in the storage-repeater device in the call-originating exchange. The storage-repeater or translating devices of all such exchanges therefore must provide for differentiating digit re-forming or translating schemes for the interoffice trunks. Changes in the number of the interoffice trunks are thus not limited to the corresponding routing point or office, but call for changes in the storage-repeater devices of all exchanges that may make use of the concerned exchange, therefore requiring changes in the digit-numbering and re-forming schemes of the entire district.

There are additional waiting intervals caused by the centralization of the storage-repeaters and also delays due to the storage and digit re-forming operations. Further delays occur at every switching point requiring the repeating of the direction-determining re-formed digit or digits. These waiting intervals cannot be compensated since the corresponding system does not provide for auxiliary storing of the remaining digits of the subscriber numbers. The system thus enforces the introduction of a pause at the termination of which the subscriber must dial again to control the setting up of the remaining stages of the call. The termination of this enforced pause is signalled to the calling subscriber by the announcement of the desired local exchange. To the waiting time prior to the announcement therefore must be added an interval required for the announcement itself.

The invention avoids the drawbacks and disadvantages of the prior system by providing impulse repeater devices only in the toll call-originating exchanges and by transmitting differentiating check-back signals from the routing points to the originating exchange, which signals, depending on the path that has been completed in the setting up of a connection, may call for the repeating of certain digits of the stored routing or district number.

These check-back signals may consist, for example, of impulses of different length, or of identical length but different in numbers, or of impulses of different frequencies, or of combinations of some or all of such impulses.

In accordance with another object, there are provided marker switches individual to the routing switches for marking the desired traffic directions. The zoning switch provided in the call-originating exchange may serve the purpose of such a marker switch.

The system made in accordance with the invention avoids temporary seizures of any kind, as well as the necessity for intermediate storage devices or impulse repeaters in all switching exchanges which follow the call-originating exchange, and provides in addition the following advantages:

Only the number for the marking of the desired traffic direction has to be evaluated. A special preselection number as a prefix to the district number is not required, thereby eliminating the need for revaluation or re-forming of the district number in storage-repeaters. The evaluation of the district number requires merely the marking of potentially available interoffice trunk directions at the routing offices. Changes in the number of interoffice trunks therefore requires only wiring changes at the routing offices, therewith considerably less work than is required in the case of the prior system which in such circumstances calls for changes in the number-evaluating devices of all call-originating exchanges that might use the concerned routing exchange.

No numerical re-forming is required by the invention, thereby obviating special re-forming schemes and avoiding limitations as to the number of interoffice trunks at each routing exchange.

Waiting intervals occur in the present system at each routing exchange for which the direction-determining marking digits of the district number have to be repeated. However, the calling subscriber can without any pause, successively dial all digits of the district number and also the digits of the called subscriber's line, and the pauses incident to repeating impulses can be reduced to a minimum, thus practically compensating for the waiting intervals during the dialling operation. This is particularly true in the case of dialling numbers having many digits. The procedure eliminates enforced pauses, thus avoiding imposition of operating limitations on the subscribers.

The invention will now be described with reference to the accompanying drawings, in which Fig. 1 shows an example of a district network;

Figures 3, 3B, 3C:
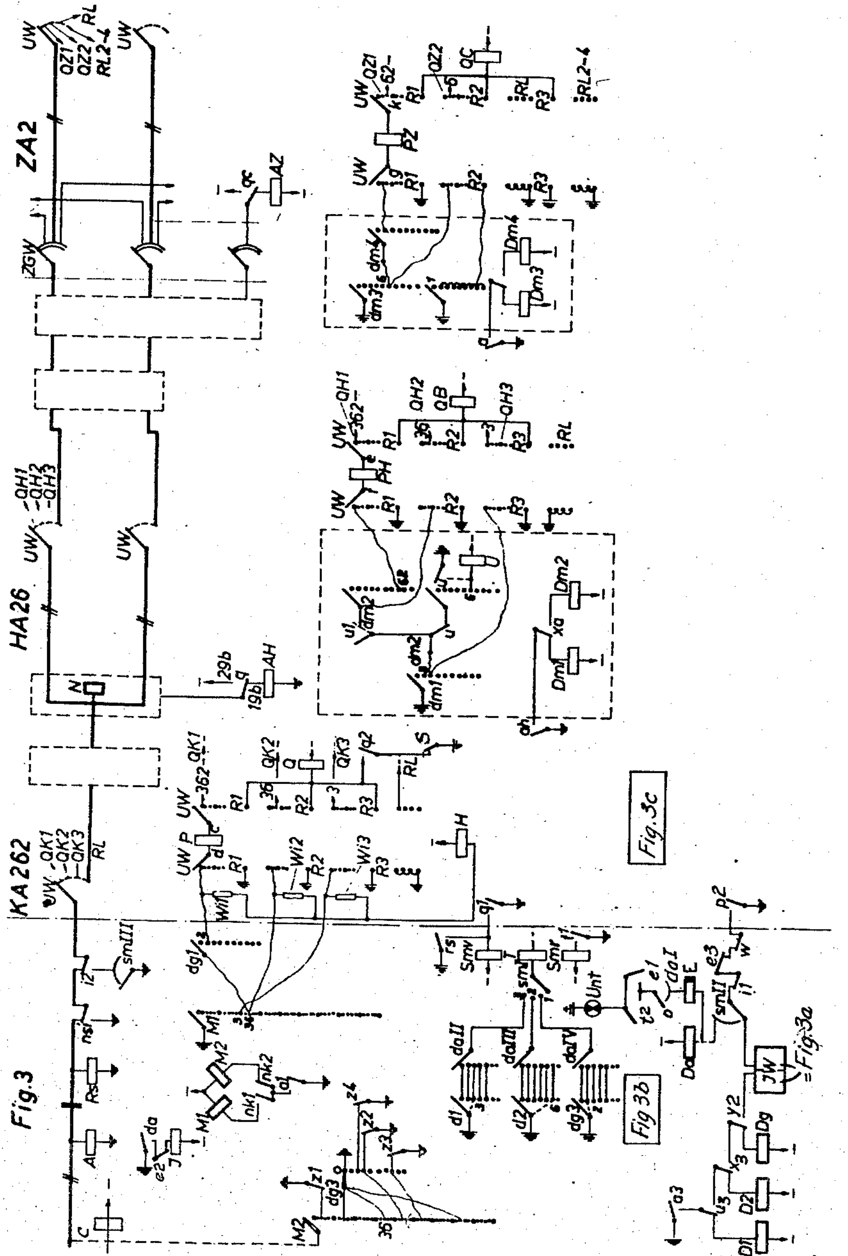
Fig. 3 is a schematic circuit diagram showing details provided in the switching offices, in the main exchange and in the central district exchange, respectively.
Figure 3A:
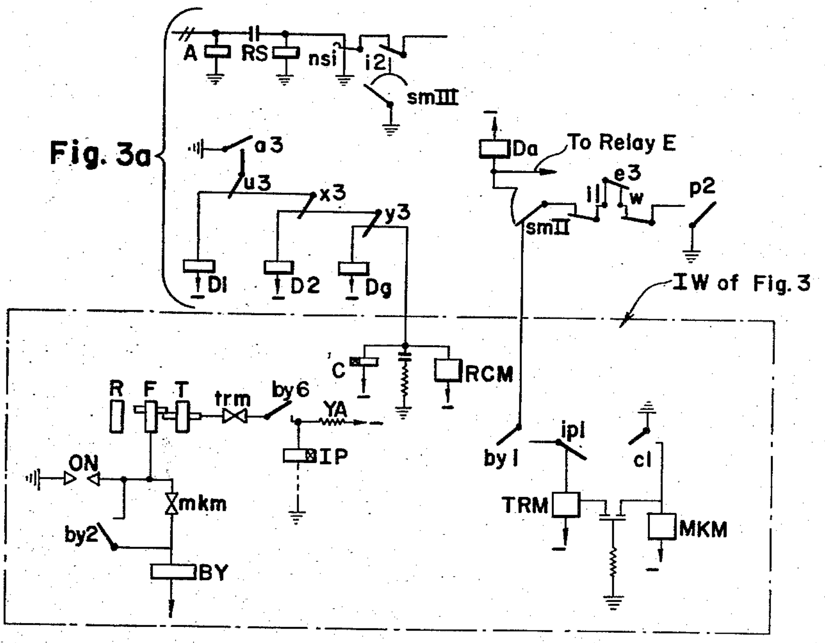
Figure 3B:
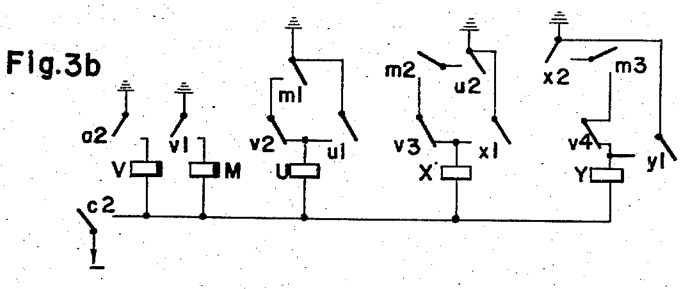
Figure 3C:
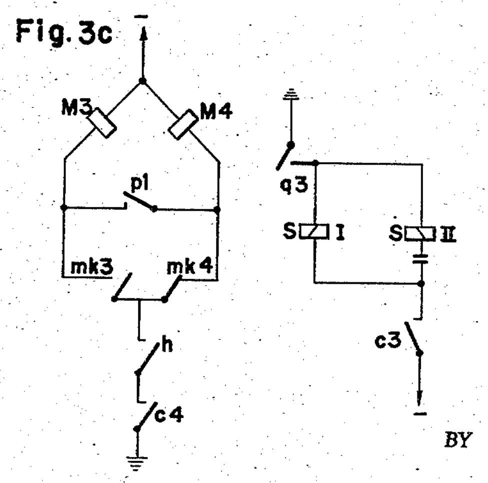

Fig. 3*a* shows a circuit of a known impulse repeater adapted for use in the circuit according to Fig. 3.

Fig. 3*b* shows a relay chain for use in the circuit according to Fig. 3; and

Fig. 3*c* shows drive means for a routing switch employed in Fig. 3.

Figure 1:
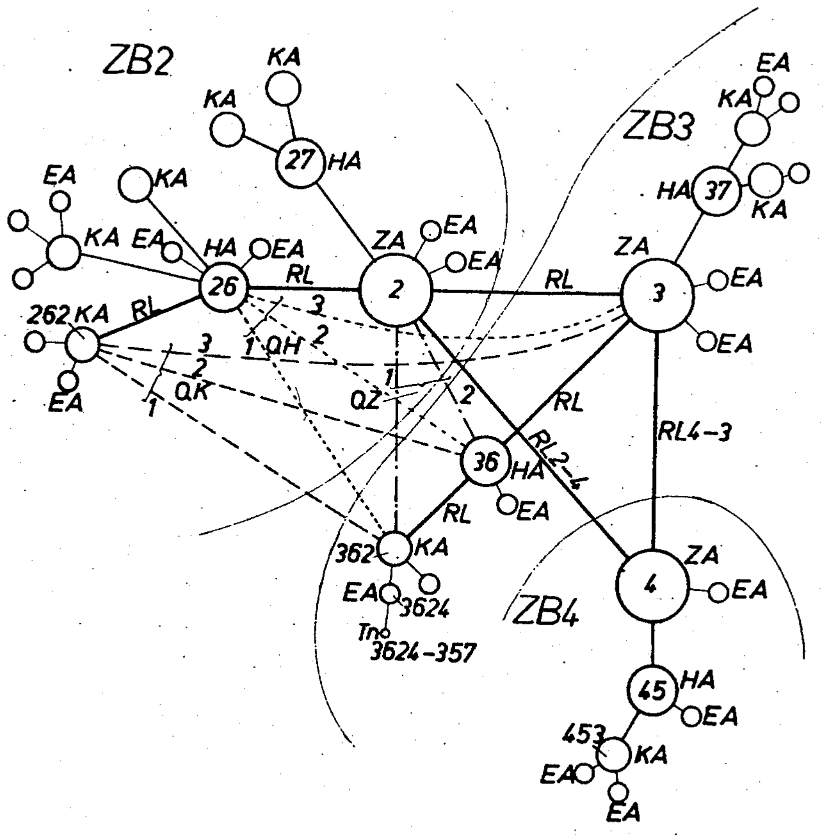

The network shown in Fig. 1 comprises, in its highest plane or class, the central district exchanges ZA; in its next lower plane, the main exchanges HA; and in its lowest plane, the switching offices KA. To the switching offices KA are connected the individual terminal or local exchanges EA. The marking numbers are in the network scheme, for example, so distributed that the digit 2 is reserved for the central district exchange ZA2 within the central exchange district ZB2; the digit 3 is for the central district exchange ZA3 in the district ZB3; and the digit 4 is for the central district exchange ZA4 in the district ZB4. The main exchanges HA within the district ZB2 therefore have the marking numbers 26, 27. Switching offices KA that may be reached from the main exchange HA26 have numbers comprising the digits 26 with a suffix added, e. g., 262, 263. Corresponding numbers are provided for the main exchanges HA and switching offices KA in the districts ZB3 and ZB4.

A toll call from a subscriber of an individual local or terminal exchange, or from a subscriber directly served by a switching office such as KA262 to the subscriber of another terminal exchange, for example, 3624—357 of the switching office KA362, is set up (after the calling subscriber connects with the equipment in his own exchange KA262 by dialling the digit 0), responsive to the digits corresponding to the direction-determining number 362. This number is stored in the switching office KA262 and the connection is first switched directly to the interoffice trunk lines QK1 leading to the switching office KA362 and, if these are busy, the connection is automatically switched over the interoffice trunk lines QK2 leading to the main exchange HA36. The connection is then directed from the main exchange HA36 over the regular or principal trunk RL to the switching office KA362. The last digit 2 of the marking number 362 is in this latter case repeated by the switching office KA262 for the setting of the group selector in the main exchange HA36. No marking digit is repeated if a direct interoffice trunk QK1 is used. If the interoffice trunk QK2 is also found busy, the connection is automatically switched by the routing switch in the exchange KA262 to the interoffice trunk QK3 (leading to the central district exchange ZA3), whereupon the impulse storage device in the exchange KA262 repeats the last two marking digits 62 so as to direct the call from the central district exchange ZA3 over the principal trunk RL to the main exchange HA36 and from there to the switching office 362. If all interoffice trunks are busy, the toll call is switched by the routing switch at the exchange KA262 to the principal trunk RL leading to the main exchange HA26 in which a routing switch now attempts in a similar manner to direct the connection over the interoffice trunks QH1, QH2 or QH3. In case these trunks are also found busy, the call will be switched over the principal trunk RL to the central district exchange ZA2 and from there in similar manner first over the interoffice trunks QZ1, QZ2 or the principal trunk RL to the central district exchange ZA3 and thence over the main exchange HA36 to the desired switching office KA362.

The entire marking number 362 is repeated at the originating switching office 262 always upon switching over of the call to a principal trunk RL to the own main exchange, or to a central district exchange in case all interoffice trunks are busy.

In the event that the principal trunk RL to the central district exchange ZA3 should be busy after the call is switched through to the central district exchange ZA2, the routing switch in this central district exchange ZA2 will automatically switch over to a by-pass to the central district exchange ZA4 over the principal trunk RL2–4 from which the call is directed, responsive to repeating of the entire marking number, to the central district exchange ZA3 over the principal trunk RL4–3. The connection is then routed to the main exchange HA36 and from there to the desired switching office KA362.

Figure 2:
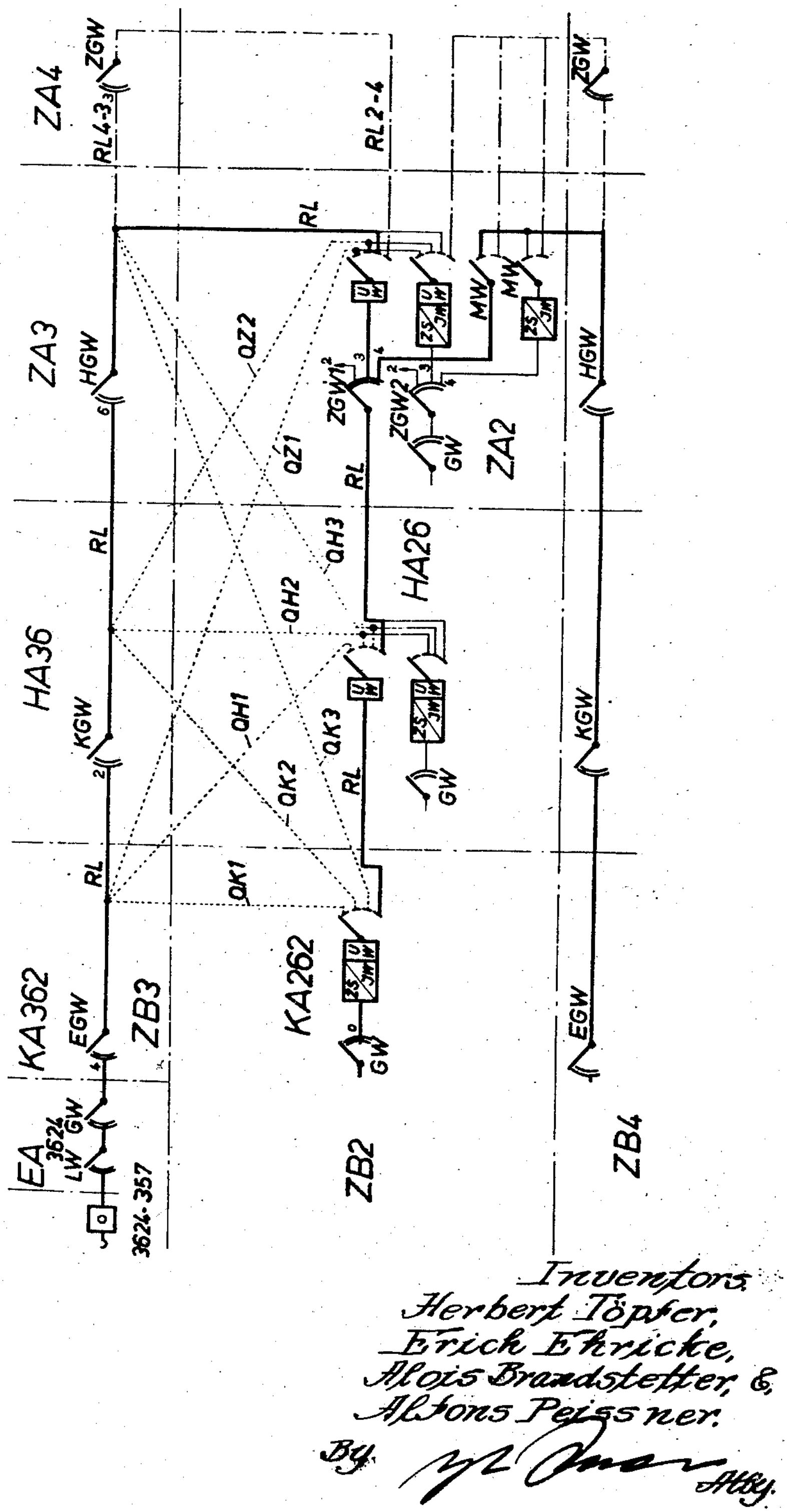
Fig. 2 shows the network of Fig. 1 in schematic circuit representation, including the switching equipment such as the selector, zoning switch, impulse repeater means and routing switch means employed in the setting up of a toll call.

The setting up of a toll call will now be explained with reference to Fig. 2 which shows the network scheme of Fig. 1 in schematic circuit representation, by including switching equipment such as a group selector, zoning switch, impulse repeater and routing switch employed in completing toll calls.

In accordance with the invention, there are provided in the switching office KA262 (district ZB2) a zoning switch ZS, an impulse repeater IW and a routing switch UW. The group selector GW, responsive to a traffic-discriminating digit 0, seizes the zoning switch ZS which receives the direction-determining marking number. In the main exchange HA26 there is provided for the through traffic only one routing switch UW; in the central district exchange ZA2 there is provided the group selector ZGW1 and a routing switch UW. For the setting up of toll calls originating in the main exchange HA26 (by subscribers directly connected thereto or by subscribers connected to sub-exchanges thereof), there are again provided a zoning switch ZS, an impulse repeater IW and a routing switch UW. The same is true so far as the central district exchange ZA2 is concerned, which provides for the setting up of originating toll calls the group selectors GW and ZGW2, the zoning switch ZS, the impulse repeater IW and the routing switch UW. It is assumed that there are no inter-office trunks leading to the central district exchange ZA4, and there are therefore mixing switches MW provided which give the possibility of switching over, to route calls over by-pass connections.

In the case of a toll call originating in the switching office KA262, or in a sub-exchange thereof, and directed, for example, to the subscriber 3624—357 connected to the subexchange EA of the switching office KA362, the group selector GW in the office KA262 will respond to the traffic-discriminating digit 0 and will seize the zone switch ZS. The calling subscriber dials without any interruption all the digits of the wanted number. Of these digits, the direction-determining number of digits 362 are stored in the zoning switch ZS. The remaining digits are stored in the impulse repeater IW which is preferably formed as a mechanical impulse repeater. The storing of the marking number or digits in the zone switch marks the desired traffic direction in the associated routing switch. The latter becomes operative after the storing of the marking digits and hunts first for an idle interoffice trunk QK1 leading to the switching office KA362. If an idle trunk is found, the impulse repeater IW will immediately transmit the digit 4 required for the setting of the group selector EGW, and then the three digits 357 of the called subscriber's number, which are effective in the sub-exchange 3624 to set another group selector and the connector, respectively, so as to complete the call.

In case there is no idle interoffice trunk QK1 leading directly to the switching office KA362, the routing switch UW will hunt for an idle trunk in the group of trunk lines QK2 which connect with the main exchange HA36. There is provided a special step between the two bank contact groups in the routing switch, the so-called "check-back step" over which is controlled the transmission of a check-back signal to the zone switch. The check-back signal prepares for the re-transmission of the last digit of the marking number by the zone switch, provided that the routing switch finds an idle trunk in the next successive group of inter-office trunks. The last digit of the marking number repeated by the zone switch ZS, which in the assumed example is the digit 2, causes the group selector KGW in the main exchange HA36 to connect with an idle principal trunk leading to the desired switching office KA362. The impulse repeater IW thereupon transmits the remaining digits of the called subscriber's number.

If there is no idle interoffice trunk to the main exchange HA36, the routing switch in the call-originating switching office KA262 will continue hunting in the group of interoffice trunks QK3 leading to the central district office ZA3. Upon transition from one group of trunk bank contacts to the other, the routing switch will again pass over intermediate check-back contacts lying between the two bank contact groups. Over these check-back contacts is controlled the transmission of a check-back signal, for example, a brief current impulse to the zoning switch of the call-originating office KA262, which prepares for the transmission of the two last digits 62 of the marking number, provided that the routing switch finds an idle trunk in the next successive trunk group. The digit 6 causes the group selector HGW in the central district exchange ZA3 to be set upon a principal trunk RL to the main exchange HA36, thereby seizing a trunk selector KGW. This latter switch is then set by the digit 2 to seize a principal trunk line RL to the desired switching office KA362, thereby seizing the group selector EGW. The succeeding digits transmitted by the impulse repeater are used to set the final group selectors in the desired switching office KA362 and the switches in the desired local exchange of the called subscriber.

However, if there is no idle trunk line to the central district exchange ZA3, the connection will be built up over the principal trunk line RL to the main exchange HA26 (of the calling party's district exchange region) to which the routing switch in the call-originating switching office KA62 switches over after finding all interoffice trunks busy. A check-back signal is transmitted to the zoning switch ZS in the call-originating office KA262, when the routing switch passes from the bank contacts of the interoffice trunks QK3 to the bank contacts of the principal trunks RL leading to the associated main exchange. This check-back impulse prepares for the transmission of the digits 362 of the whole marking number, provided that the routing switch finds an idle principal trunk RL to the main exchange HA26. The series of impulses corresponding to the whole marking number 362 is transmitted by the zoning switch in the call-originating office KA262 when the routing switch in such exchange has seized an idle principal trunk line, thereby seizing a routing switch UW in the main exchange HA26. This number is stored in the corresponding routing switch by an associated coacting rotary switch, so as to mark the desired traffic direction. After receiving the marking digits, the routing switch UW in the main exchange HA26 operates and in similar manner (like the routing switch in the exchange KA262) successively hunts for an idle trunk in the interoffice trunk groups QH1, QH2, QH3, and finally in the group of principal trunk lines RL leading to the central district exchange ZA2. A check-back signal is again given to the call-originating switching office KA262 always at the transition by the routing switch from one trunk line group to the next, so as to prepare for the subsequent transmission from the call-originating office KA262 of the digits corresponding to the required marking number, depending of course on the seizure by the routing switch in the main exchange of an idle interoffice trunk line to the desired switching office (KA362), or to the main or central district exchange, or seizure of an idle principal trunk to the associated central district exchange, respectively.

A central group selector ZGW1 is taken into use when the routing switch UW in the main exchange HA26 seizes an idle principal trunk line RL to the central district exchange ZA2. The zoning switch ZS in the call-originating office KA262 re-transmits the entire direction-determining marking number 362 upon termination of the hunting period of the routing switch UW in the main exchange HA26. The first digit 3 sets the central district exchange group selector ZGW1 upon a routing switch UW. The latter has access to interoffice trunks QZ1 leading directly to the desired switching office KA362, as well as to trunks QZ2 leading to the main exchange HA36, and also has access to principal trunks RL leading to the central district office ZA3. The second and third digits, 6 and 2, of the direction-determining marking number are stored in the routing switch UW of the central district exchange ZA2. The first digit 3 has been absorbed in the setting of the central group selector. The switching operations which take place incident to the hunting of trunk lines to the marked switching office KA362 are analogous to those which take place in the hunting of trunks in the main and switching exchanges, respectively. Depending upon the path over which the connection was built up, whether over direct interoffice trunk lines or over by-pass trunks, there will be given differentiated check-back signals, or such signals will be omitted. In the case under consideration there will be transmitted check-back signals in the form of corresponding numbers of impulses—in intermediate positions of the bank contacts groups—back to the call-originating office KA262, which call for the re-transmission of the digits of the marking number, depending on the path selected for building up the call.

If the routing switch in the central district exchange ZA2 finds that the interoffice trunks to the desired switching office KA362, as well as to the main exchange HA36, and also the principal trunks to the central district exchange ZA3 are busy, it will test a by-pass connection over the principal trunk RL2–4 to another centrral district office ZA4. Upon transition over the three different bank contact groups, there will be transmitted back to the call-originating office KA262 a corresponding number of digits (three), whereby the zoning switch in this call-originating office KA262 is caused to re-transmit the entire marking number, beginning with the digit 3. The first digit is required for the setting of the group selector ZGW in the central district exchange ZA4. Thereupon are transmitted the marking digits 6 and 2 for the setting of the group selectors in the main exchange and in the desired switching office, and the impulse repeater IW finally transmits the remaining digits.

The scheme described above assumes that there are provided interoffice trunks going from all network points in all three network planes or classes, that is to say, going to the switching office, to the main exchange and also to the central district exchange. The routing switch operates to hunt for an idle interoffice trunk to the switching office after the third digit. If there is no idle interoffice trunk to the switching office, the switching over takes place after the second digit, provided that an idle interoffice trunk is available to the main exchange of the corresponding district. If there is no such interoffice trunk to a main exchange, the operation of the routing switch starts after the first digit. In order to reconcile the transmission of the current impulses in these cases with the demand therefor and to utilize transmitted impulses for the at least partially without repeating, the interoffice trunks to main exchanges (in the region of which there are no interoffice trunks to switching offices) and interoffice trunks to central district exchanges (having no interoffice trunks to their switching offices and main exchanges) are placed in the bank multiple of the routing switch ahead of the check-back contacts. If there are no interoffice trunks to the switching offices, but interoffice trunks to the main exchanges and to the central exchanges of the same region, the lines to the central exchange will be connected ahead in the bank multiple of the routing switch, by one check-back contact, so that the trunks to the main exchanges are found in the first bank contact group and the trunks to the associated central exchange in the second group.

The circuit details provided in the call-originating switching office, in the main exchange and at the central district exchange, respectively, which are required for an understanding of the invention are apparent from Fig. 3, some details incorporated in Fig. 3 being indicated separately in Figs. 3*a*, 3*b* and 3*c*.

The zoning switch ZS, which is in the switching office KA262, comprises a motor switch having the field coils M1, M2 and having a plurality of wipers, and a rotary switch having a stepping magnet D*g* (see also Fig. 3*a*) for the control of the zones and the storage of the first three series of impulses, which are the impulses of the direction-determining marking number. The first two series of impulses are simultaneously received by stepping magnets D1 and D2 of two associated rotary switches (see also Fig. 3*a*). The latter serve with the rotary switch having the magnet D*g* for the transmission of the series of impulses which are to be repeated. It is possible to use, in place of separate rotary switches, additional wipers of the motor switch for the re-transmission of the series of current impulses.

The incoming dial impulses are in usual known manner received by the line relay A (see also Fig. 3*a*) which is connected to one of the line conductors. The first series of impulses is transmitted by contact *a*1 of the relay A to the two field coils M1, M2 of the motor switch, such coils being displaced relative to one another by ninety degrees. The motor switch is controlled by the cams *nk*1 and *nk*2, and executes large steps over its bank multiple which is subdivided into decades of contact groups. The second series of impulses then controls the motor switch by means of a suitable control relay (not shown) to execute individual steps so as to set its wipers upon selected bank contacts. The first series of impulses is at the same time transmitted by the contact *a*3 to the magnet D1 of a rotary switch, and the second series of impulses is similarly transmitted to the magnet D2 of a rotary switch by way of contact *a*3 and a contact *u*3 of a switching relay U shown in Fig. 3*b*. The third series of impulses is transmitted to the magnet D*g* of a rotary switch by way of the contact *a*3 and actuated contact *u*3 of the first-mentioned switching relay U and also contact *x*3 of a second switching relay X shown in Fig. 3*b*, which has meanwhile become energized. After the conclusion of the third impulse series, there is energized a switching relay Y (Fig. 3*b*) for actuating the contact *y*3 so that the additional series of impulses are transmitted to a mechanical impulse repeater IW where they are stored.

The switching of the contacts *u*3, *x*3, *y*3 by the relays U, X and Y is explained below with reference to Fig. 3*b*.

The line or impulse relay A which actuates responsive to receipt of the various impulse series (digits) and actuates the contact *a*3 (Fig. 3) also actuates contact *a*2 (Fig. 3*b*). Accordingly, a slow-to-release relay V will be actuated during each impulse series. Contact *c*2 is a contact controlled by relay C (Fig. 3) upon seizure of the equipment by a calling line. Relay V closes contact *v*1 to energize slow-to-release relay M. Relay V restores at the conclusion of the first impulse series, closing contact *v*2 while contact *m*1 of relay M is still closed.

Relay U accordingly energizes and actuates its contact *u*3 (Fig. 3) to switch the impulse circuit from contact *a*3 to magnet D2. Relay U remains operated in a holding circuit over its own contact *u*1.

Relay X is energized after the second impulse series during the deenergization interval of relay M, in a circuit from ground, *u*2, *m*2, *v*3, X, *c*2 to battery. Relay X actuates its contact *x*3 (Fig. 3) to switch the impulsing circuit from contact *a*3 over to the magnet D*g* so that this magnet will be actuated responsive to the next following (3rd) impulse series. Relay X remains actuated in a holding circuit over its own contact *x*1.

Relay Y energizes after the third impulse series during the deenergization interval of relay M, in a circuit from ground *x*2, *m*3, *v*4, V, *c*2 to battery, closing a holding circuit for itself over contact *y*1. Relay Y also actuates contact *y*3 (Fig. 3) to switch the impulsing circuit from contact *a*3 to the impulse repeater JW (see also Fig. 3*a*). Accordingly, the fourth and all further impulse series will be transmitted to the impulse repeater and stored therein.

Necessary details of a motor switch of a type having the field coils M1 and M2 may be had from consulting copending application Ser. No. 269,224, filed January 31, 1952, now Patent No. 2,701,824, dated February 8, 1955. Impulse storage and repeating devices that may be used in place of the device IW are likewise well known, and the corresponding device has therefore been indicated in Fig. 3 merely in a diagrammatic manner. U. S. Patent No. 2,188,461, dated January 30, 1940, describes a mechanical impulse repeater that may be easily modified for use as impulse repeater JW indicated in Fig. 3. The pertinent parts are shown within the dot-dash rectangle of Fig. 3*a*.

Referring now to Fig. 3*a*, the elements shown above the dot-dash rectangle are also shown in Fig. 3. They include the line relay A, a capacitor, relay RS, contact *nsi*, and contact *i2* one side of which is connected to a bank contact of a switch wiper *sm*III. The contact *nsi* corresponds to a contact marked *imp* in Fig. 1 of the previously mentioned Patent No. 2,188,461. Below these parts are shown the contacts *a*3, *u*3, *x*3 and *y*2 and switch magnets controlled thereby, and also the switch magnet D*a* connected to a bank contact accessible to a switch wiper *sm*II, all as shown in Fig. 3. The conductor extending from one side of the contact *y*2 and the conductor extending from wiper *sm*II terminate respectively in receiving magnet RCM and over certain contacts in the transmitting magnet TRM of the known impulse repeater. MKM indicates a marking magnet and ON indicates an off-normal contact.

Impulses are transmitted to the receiving magnet RCM of the known impulse repeater JW of Fig. 3 (dot-dash rectangle of Fig. 3*a*) over a circuit including contacts *u*3, *x*3, *y*2 of the relays X, U, Y (Fig. 3*b*). The operation of the transmitting magnet TRM is released responsive to closure of contact *p*2 by way of contact *e*3 and *i*1 in a manner which will be presently described more in detail. The transmitting magnet TRM, upon operating as described in Patent No. 2,188,461, causes actuation of the contact *imp* (Fig. 1 of the patent referred to), such contact being designated in Fig. 3 as *nsi*, to transmit digits of the wanted subscriber's number.

Returning now to the description of Fig. 3, after the marking number 362 has been received, the wipers M1 and M2 of the motor switch belonging to the zoning switch will be in the position 36 and the wipers *dg*3 of the rotary switch D*g* will be in position 2. Over the wiper M2 of the motor switch and the wiper *dg*3 of the rotary switch D*g* there are connected the various zoning contacts, for example, *z*1 to *z*4. In the present case the zoning contact *z*4 will be connected to the calling line. The direction of the call, which is determined by the stored marking number, is marked in the routing switch by the connections provided between the bank multiple accessible to the wiper M1 of the motor switch, the bank multiple accessible to the switch wiper *dg*1 and the multiple scanned by the switch wiper *d* of the routing switch. Any line marked is at the same time the line over which the routing switch is caused to start its operation. The start relay H is common for all traffic directions and therefore can operate only after receipt of the corresponding marking digits. High-ohmic resistors W*i*1, W*i*2, W*i*3 are provided in the branch start circuits to the relay H to prevent testing (seizure) of the routing switch in unmarked directions. Also associated with the zoning switch is a digit switch having the magnet D*a* and a control switch having the magnets S*mv* and S*mr*. Over the switch arm *da*II of the digit switch having the magnet D*a* is obtained the first digit 3 stored by the switch D1; over the arm *da*III is obtained the second digit 6 stored by the switch D2; and over the arm *da*IV is obtained the third digit 2 of the marking number which has been stored by the switch D*g*, at a time when these digits are to be transmitted, as called for by a check-back signal sent out by the routing switch. The sequence of the digits to be transmitted is determined by the control switch having the magnets S*mv* and S*mr* which is a step-by-step switch capable of operating in two directions. The forward operation of this control switch is controlled by the switching magnet S*mv* and its reverse operation is controlled by the magnet S*mr*.

When the zoning switch in the switching office KA262 is seized by a preceding group selector for setting up a toll call in the direction of the switching office 362, there is at the same time seized the routing switch UW. The drive means of the routing switch is similar to the drive means M1 and M2 for the zoning switch and is illustrated in Fig. 3*c*. It comprises the field magnets or coils M3 and M4. After the storage or marker switch has been set, relay H (Fig. 3) will be deenergized as will be presently described more in detail, to start the operation of the routing switch UW. The start circuit extends from ground, *c*4, *mk*4, field magnet M4, to battery. The contact *mk*4 is a cam contact of the switch which may be of the kind described in the previously mentioned Patent No. 2,701,824. The routing switch UW, during its operation, actuates alternately cam contacts *mk*3 and *mk*4. The routing switch hunts for an idle trunk QK1 leading to the exchange 362 (Fig. 3), as will be presently described more in detail, and as soon as an idle trunk is found, the test relay P (Fig. 3) will be energized and will actuate its contact *p*1 (Fig. 3*c*) to energize both field magnets M3 and M4 simultaneously, thus causing the switch to stop. As will be presently described, if the routing switch does not find an idle trunk in the corresponding trunk group, it will hunt in the next trunk group. Between the bank contacts of the respective trunk groups are disposed bank contacts for control purposes (contacts R1, R2, R3 in Fig. 3). The relay P will energize when the switch wipers engage these control contacts and will stop the switch by closing its contact *p*1 (Fig. 3*c*) as described. A relay Q (Fig. 3) will also be actuated together with relay P. Relay Q actuates a contact *q*2 (Fig. 3), thereby short-circuiting relay P to ground at contact *s* controlled by a relay S (Fig. 3*c*). Relay P accordingly restores and the routing switch continues to hunt in the next group of trunk lines. Relay Q upon energizing also closes contact *q*3 (Fig. 3*c*) to connect two differential windings I and II of relay S which is slow-to-operate. The functions of relay S will be presently explained more in detail.

As has been indicated before, after receipt of the marking digits, the routing switch which is started by the operation of the relay H first hunts in the group of direct interoffice trunks QK1 leading to the desired switching office 362. As soon as an idle trunk line is found in this group, the relay P of the routing switch will energize from ground, M1 in position 36, D*g*1 in position 2, switch arm *d* of the routing switch, winding of relay P, switch arm *c* of the routing switch, trunk line 362 to battery. Relay P causes deenergization of a slow-to-release relay which controls the contact *w*. This slow-to-release relay has not been shown, because it is known and would merely encumber the drawing. After its release there is closed a start circuit for the impulse repeater IW over contacts *p*, *w*, switch arm *sm*II of the control switch in position 0 thereof. The impulse repeater starts the transmission of the remaining digits of the called subscriber's number which, in the assumed example, are the digits 4, 3, 5, 7. If the routing switch UW does not find an idle trunk in the trunk group QK1, it will continue to hunt in the next trunk group QK2. Between these groups are disposed the previously mentioned check-back contacts R1. When the switch arms *d*, *c* of the routing switch engage the contacts R1, the relay Q will be energized from ground, R1, *d*, P, *c*, Q to battery. Relay P also energizes in this circuit and exerts a braking action on the switch so as to permit the relay Q to energize. However, relay P is immediately shunted over contact *q*2 and deenergizes so that the switch can continue its hunting operation. Relay Q closes at its contact *q*3 (Fig. 3c) a circuit for the differential windings of relay S which opens its contact *s* (Fig. 3) to deenergize relay Q. Ground is connected to the magnet Smv by contact *q*1, thus giving this magnet a control impulse. The control switch moves its wipers *sm*I and *sm*II into position 1. The routing switch UW continues hunting in the next trunk group QK2 containing the interoffice trunk lines to the main exchange HA36. A slow-to-release relay (not shown) becomes deenergized after conclusion of the hunting period, thus closing contact *w* to complete the circuit for the rotary magnet D*a* of the digit switch when the routing switch finds an idle trunk in the group QK2. The circuit extends from ground, *p*2, *w*, *e*3, *i*1, *sm*II, D*a* to battery. It may be mentioned that in such a case the test relay P of the routing switch is energized over the switch arms *d*, *c* of the routing switch and the seized trunk in a manner described before.

If no idle trunk is found by the routing switch UW in the trunk group QK2, it will continue hunting in the next trunk group QK3. The relay Q is again energized when the switch wipers *d* and *c* reach the check-back contacts R2, and the magnet S*mv* of the control switch receives another impulse to move its wipers *sm*I and *sm*II into position 2. If there is no idle trunk in this group, the routing switch UW will continue hunting in the bank multiple containing contacts of the principal trunks RL which lead to the own main exchange HA26. Upon transition from the third to the fourth trunk group, the relay Q will again receive an impulse in the check-back position R3 of the wipers *d* and *c* of the routing switch UW. Magnet S*mv* of the control switch will accordingly also receive an impulse and the control switch wipers *sm*I and *sm*II will assume position 3.

It shall now be assumed that the routing switch has found an idle trunk in the last trunk group RL. The test relay P energizes from ground, switch arm *d* of the routing switch UW, P, switch UW arm *c* of the routing switch UW, to battery on the seized trunk line RL. Relay P causes, as before, deenergization of the slow-to-release relay (not shown) which controls contacts *w*, and after the release of such relay closes the following circuit for the rotary magnet D*a* of the digit switch: ground, *p*, *w*, *i*1, *sm*II, D*a* to battery. The rotary magnet D*a* energizes and connects over its contact *da* a circuit for the energization of relay J. Upon energizing, relay J interrupts at its contacts *i*1 the circuit of the rotary magnet D*a* of the digit switch, causing this magnet to deenergize and to open its contact *da*, thus causing deenergization of relay J which restores its contact *i*1 to reenergize magnet D*a*. The digit switch is thus operated step by step by interplay of the magnet D*a* and the relay J. The wipers *sm*I and *sm*II of the control switch are in position 3, and the digit 3 which has been stored by the wiper *de* controlled by magnet D1 is now released to operate relay T. A ground impulse is given to the main exchange at each step of the digit switch over the contact *i*2 and the wiper *sm*III of the control switch. After three steps and consequently three impulses to the main exchange, the relay T will energize from ground, *d*1 in position 3, *da*II in position 3, *sm*I in position 3, T to battery. Relay T closes its contact *t*, giving an impulse to the magnet S*mr* which is operative to rotate the wipers *sm*I and *sm*II in reverse direction into position 2. The switch D*a* is in the meantime quickly restored to normal in a circuit extending from an interrupter U*nt*, contact *t*2 of relay T, wiper *da*I, and slow-to-operate relay E. This circuit is after deenergization of relay T maintained over contact *e*1 of relay E. The circuit is interrupted when wiper *da*I returns to normal. A new circuit is now effective for D*a* which extends from ground, *p*2, *w*, *e*3, *i*1, *sm*II, D*a*, to battery.

The magnet D*a* of the digit switch has in the meantime restored its wipers *da*II, *da*III and *da*IV to normal position by suitable known means, not shown in the drawing. It begins to rotate again and by means of its wiper *da*III releases the digit 6 of the marking number, which has been stored by the wiper *d*2 controlled by magnet D2. An impulse is transmitted to the main exchange at each step of the digit switch by means of the contact *i*2 of the relay J as before. After the wipers *da*II, *da*III, *da*IV of the digit switch have moved by six steps, the relay T will again momentarily energize over the wipers *d*2, *da*II and switch wiper *sm*I in position 2. Relay T gives an impulse to the magnet S*mr* of the control switch to rotate its wipers another step in reverse direction so as to assume position 1.

The digit switch (magnet D*a*), which meanwhile has again returned to normal, again starts to rotate in order to release over its wiper *da*IV the digit 2 of the marking number which had been stored by the wiper *dg*3 controlled by magnet D*g*. A current impulse is again transmitted to the main exchange HA26 by the operation of contact *i*2 incident to each step of the digit switch. Relay T energizes again after two steps over the wiper *sm*I in position 1, wiper *da*IV in position 2 and wiper *dg*3 in position 2. The magnet S*mr* again receives an impulse to drive the wipers of the control switch into normal position.

In this normal position, there is connected over the wiper *sm*II of the control switch the impulse repeater IW which now transmits the remaining digits of the called subscriber's number. The corresponding impulses are transmitted as ground impulses by the contact *nsi*.

The seizure of the principal trunk RL by the routing switch WU in the call-originating switching office KA262 causes seizure of a similar routing switch UW in the main exchange HA26. After conclusion of the hunting for the idle trunk line RL takes place the transmission, as above described, of the series of impulses of the marking number, beginning with its first digit. The impulses are received in the main exchange by the relay AH and are re-transmitted over its contact *ah* to the rotary magnet D*m*1 of a rotary switch having the wiper *dm*1. Upon conclusion of the first impulse series takes place a switching over operation to the rotary magnet D*m*2 of a second rotary switch (having wipers *dm*2) by the energization of a relay (not shown) which actuates the contact *xa*. The magnet D*m*2 of the rotary switch receives the second impulse series. The third impulse series is also received by the rotary magnet D*m*2, but there is a coincident switching to another wiper of the switch by the relay U. The switch executes a corresponding number of steps.

The digits received by the storage switches controlled by magnets D*m*1 and D*m*2 mark in the routing switch UW in the main exchange the desired direction to the called switching office KA362. The routing switch operates after receiving the digits of the marking number in the same manner under the control of a start relay H as the routing switch in the call-originating switching office KA262.

The test relay PH of the routing switch operates from ground, wiper *dm*1 in position 3, *u*1, wiper *dm*2 in position 62, wiper *f* of the routing switch, PH, wiper *e* of the routing switch, trunk line 362 to battery, as soon as an idle trunk is found in the trunk group leading directly to the desired switching office KA362. Relay PH stops the routing switch and switches the line conductors through. The impulse repeater IW of the call-originating switching office thereupon transmits by means of contact *nsi* the remaining digits of the called subscriber's number.

If the routing switch does not find an idle trunk in the trunk group QH1, it will continue hunting in the next trunk group QH2. Between the bank contacts of the two trunk groups are again provided the check-back contacts R1 over which a circuit is closed for the energization of relay QB when the wipers *f* and *e* of the routing switch pass from the first to the second group, the circuit extending from ground, R1, wiper *f*, PH, wiper *e*, R1, QB to battery. The relay PH energizes momentarily. The relay QB opens its contact 1*qb*, thereby disconnecting the impulse relay AH from the line, and closes its contact 2*qb* to transmit a brief battery impulse back over the line which is received by the relay RS in the zone switch disposed in the call-originating office KA262.

Relay RS closes its contact *rs*, thereby closing a circuit for the magnet S*mv* of the control switch. The latter moves its wipers from position 0 to position 1. Whenever the relay RS operates, it causes energization of a slow-to-release relay which controls the contact *w*. After conclusion of the hunting period of the routing switch in the main office HA26, if there is no more check-back impulse, there will thus be completed a circuit for the magnet D*a* of the digit switch from ground, *p*, *w*, *i*1, *sm*II, D*a* to battery. The digit switch scans in position 1 of the wiper *sm*I control switch the third digit (2) of the marking number and transmits a corresponding number of impulses to the main exchange HA26. Relay PH of the routing switch in the main exchange HA26 operates during the hunting period from ground, *dm*1, *u*1 (position 36), PH, *e*, line 36 to battery. Relay PH stops the routing switch and switches the line conductors through.

If the routing switch does not find an idle trunk in the trunk group QH2, it will continue hunting in the trunk group QH3. When the wipers *f* and *e* pass over the check-back contacts R2 (disposed between the bank contacts of the two trunk groups) the relay QB will again energize and will transmit a battery impulse back to the call-originating switching office KA262, which will cause energization of relay RS, as before. The latter relay again energizes the magnet S*mv* control switch to step its wipers by one step, from position 1 to position 2. If there is no further check-back impulse during the interval when relay RS causes the deenergization of the relay having the contact *w*, the magnet D*a* of the digit switch will again operate (it being assumed that the routing switch in the main exchange has meanwhile found an idle trunk) from ground, *p*, *w*, *i*1, *sm*II, D*a* to battery. The digit switch senses the second digit (6) of the marking number over its wiper *da*III and causes transmission to the main exchange of a corresponding number of impulses as described before.

Relay T in the zone switch of the call-originating office KA262 is actuated after the digit switch has transmitted the second digit. It closes a circuit for the reverse magnet S*mr* of the control switch. The latter executes a step in reverse direction and moves its wipers from position 2 to position 1. Thereupon is again completed a circuit for the magnet D*a* of the digit switch (which meanwhile has returned to normal) from ground, *p*, *w*, *i*1, *sm*II, D*a* to battery. The digit switch now operates to sense the last digit (2) of the marking number, causing transmission of a corresponding number of impulses to the main exchange HA26, as before. Relay T again operates after the transmission of this digit to actuate the control switch from its position 1 to position 0. The circuit for the magnet D*a* of the digit switch is thus interrupted.

If the routing switch does not find an idle trunk in the trunk group QH3, it will continue hunting in the group of principal trunks RL leading to the central district exchange ZA2. Upon passing from the trunk group QH3 over the check-back contacts R3 to the trunk group RL, the routing switch will transmit another check-back impulse to the zone switch in the call-originating office. This impulse again energizes the relay RS which causes the magnet S*mv* of the control switch to move wiper *sm*I from position 2 to position 3. The relay controlling the contact *w* is at the same time caused to deenergize.

If it is now assumed that the routing switch in the main exchange HA26 finds an idle principal trunk line RW to the central district exchange ZA2, there will be a circuit closed (after closure of contact *w*) for the magnet D*a* of the digit switch D*a* from ground, *p*, *w*, *i*1, *sm*II, D*a*, to battery. The digit switch thereupon quickly restores its wipers to normal. The control switch magnet S*mv* steps the corresponding wipers from position 3 to position 2. The magnet D*a* of the digit switch is then re-energized in the previously described circuit. The second digit (6) is now sensed by the wiper *da*III and the control switch wiper *sm*I moves thereafter from position 2 to position 1. The digit switch moves its wipers again to normal position and is subsequently again operated as described, to sense the third digit (2) of the marking number. The control switch magnet S*mv* thereafter moves the wiper *sm*I from position 1 to position 0, and the digit switch magnet D*a* returns the corresponding wipers to normal. The circuit for the impulse repeater IW is now completed over the wiper *sm*II to transmit the remaining digits of the called subscriber's number.

The transmission of the first digit 3 of the marking number causes the setting of group selector ZGW in the central district exchange ZA2 on the trunk of the associated routing switch UW which is similar to the correspondingly marked routing switches described before. The two subsequent digits (6, 2) of the marking number are received by and stored in the coacting rotary switches having the magnets D*m*3 and D*m*4. The stored number 62 marks in the routing switch of the central district exchange the desired direction to the wanted switching office KA362. The routing switch, which is in this case preferably a four-conductor motor switch having several switch arms (such as disclosed in the copending application Ser. No. 269,224, filed January 31, 1952 now patent No. 2,701,824) begins to operate after the last two digits of the marking number have been received by the associated rotary switches D*m*3 and D*m*4, and hunts for an idle trunk, first in the trunk group QZ1 leading to the desired switching office KA362. If an idle trunk is found, the relay PZ will operate from ground, *dm*3 (position 6), *dm*4 (position 2), *g*, PZ, *k*, trunk line 62 to battery. The remaining digits 4, 3, 5, 7 of the desired number are now received from the impulse repeater IW of the calling switching office for the setting of the switches in the called office and its sub-exchange.

If the routing switch in the central district exchange ZA2 does not find an idle trunk in the trunk group QZ1, it will continue to hunt in the trunk group QZ2 leading to the associated main exchange. A check-back impulse is again transmitted to the call-originating office KA262 by the operation of relay QC when the wipers *g* and *k* of the routing switch pass over the check-back contacts R1 which are disposed between the bank multiple contacts of the two trunk groups, so as to cause operation of the relay RS in the call-originating office. Means may of course be provided in the central district office to transform the impulse so as to transmit over the connection that has so far been built up an alternating current impulse or a sound frequency impulse, and suitable means may be provided in the call-originating office to re-transform such alternating current or sound frequency impulse to a direct current impulse for the operation of the relay RS. Such means have not been shown because they are well known in the art. The magnet S*mv* of the control switch in the call-originating office KA262 is actuated responsive to the operation of relay RS to move its wipers from position 0 to position 1, as described before, thereby preparing for the re-transmission of the last digit 2 of the marking or district number at a time when the routing switch in the central district exchange finds an idle trunk in the trunk group QZ2.

However, if there is no idle trunk in the trunk group QZ2, the routing switch in the central district exchange ZA2 will continue to hunt in the group of principal trunks RL leading to the central district exchange ZA3. A check-back impulse is again transmitted when the wipers of the routing switch in the exchange ZA2 pass from the trunk group QZ2 to the trunk group RL, by the operation of the relay QC, over the circuit involving the switch wipers *g* and *k* and the check-back contacts R2 to actuate the relay RS in the call-originating office KA262, as before, so as to operate the magnet S*mv* of the control switch to prepare for the re-transmission of the two last digits of the marking number, which are transmitted when an idle trunk RL to the central district exchange ZA3 is found.

If such idle trunk is not found, the routing switch in the central district exchange ZA2 will continue hunting in a trunk group RL2–4, forming by-pass trunks to the central district exchange ZA4. Three check-back impulses are in this case transmitted back to the call-originating office KA262, which are received by the relay RS to cause the associated magnet S*mv* of the control switch to operate so as to move its wipers from position 2 to position 3, thereby preparing for the re-transmission of the entire marking or district number 362. The first digit 3 of the marking number is transmitted by the impulse storage device JW of the call-originating office KA262 at the conclusion of the hunting period of the routing switch in the central district exchange, that is, at the time when this routing switch finds an idle trunk line RL2–4 to the central district exchange ZA4, thereby seizing a group selector ZGW in such exchange. This group selector is by this digit 3 set on a trunk line to the central district exchange ZA3, thereby seizing a group selector HGW. See also Fig. 2. The next digit 6 transmitted from the call-originating office KA262 sets the group selector in the central district exchange ZA3 to seize a trunk line to the associated main exchange HA36, thereby seizing the group selector KGW. The last digit 2 of the marking number finally causes operation of the group selector KGW to seize a trunk line to the switching office KA362, which terminates in the selector EGW. The remaining digits, which are thereupon transmitted by the impulse repeater IW of the call-originating office KA262, set the group selector EGW of the desired switching office KA362, and finally the switches of the associated sub-exchange EA, to complete the call to the desired subscriber number 3624—357.

The release of the connection has no bearing on the invention, and description thereof has therefore been omitted.

The separation of the impulse-repeating means in the call-originating exchanges into means for repeating only the direction-determining marking or district number and means for transmitting the remaining digits corresponding to the called subscriber's local number gives the possibility to re-transmit the marking numbers by suitable and known means in a different form, for example, in accelerated sequence or in the form of codes. The time required for completing connections can thereby be appreciably shortened.

It should be observed that it is not absolutely necessary to associate the zoning means in the call-originating offices individually with the corresponding routing switches. If desired for reasons of economy or the like, these means may be disposed centrally, and such central zoning means may transmit the marking determined by a stored marking or district number, for example, by impulses, to individual marking equipment.

It is likewise not absolutely necessary to repeat only part of the digits of a marking district number, as described. If desired, the digits of the entire direction-determining number may be re-transmitted and impulse repeaters may be provided in the various switching exchanges, which suppress unnecessary digits.

It may be mentioned in conclusion that the zoning switch in the call-originating exchanges (which is used, as described, as a marking switch for the associated routing switch) is in usual manner employed for metering the toll calls.

Changes may be made within the scope and spirit of the appended claims.

What is claimed is:

1. In a multi-exchange automatic telephone system having a plurality of exchanges of different classes and direct and detouring trunk lines disposed therebetween for setting up connections extending from an originating exchange through intervening intermediate exchanges to a destination exchange, impulse storing means in a call originating exchange for receiving and storing impulses corresponding to digits of a called line desired in a toll call, means in said intermediate exchanges responsive to extending a toll call thereto for transmitting differentiating check-back signals to said impulse storing means in the call originating exchange, said check-back signals being characteristic of the class of trunk lines momentarily available in the corresponding intermediate exchange for extending the respective toll call to the destination exchange, a control switch for governing the sequence of digits to be transmitted responsive to said check-back signals, and repeater means cooperating with said storing means in the call originating exchange for transmitting to the corresponding intermediate exchange over said control switch only that part of the stored impulses corresponding to digits required for extending the respective toll call to the destination exchange.

2. The circuit arrangement defined in claim 1, comprising a switch in said intermediate exchange, said switch having access: to a first group of trunk lines leading directly to the called exchange; to a second group of trunk lines leading to a distant main exchange interconnected with the called exchange; to a third group of trunk lines leading to a central exchange of the district of the called subscriber; and to a fourth group of trunk lines leading to a central exchange of another district; said means for transmitting characteristic check-back signals being operative to omit transmission of such signals when said routing switch selects a trunk line in said first group and to transmit, respectively, one, two or three check-back signals when said routing selector switch selects a trunk line in the second, third or fourth group, respectively.

3. The circuit arrangement defined in claim 1, wherein impulse storing means in the call-originating exchange which is responsive to said check-back signals includes a control switch having switch wipers coacting with contacts on which the stored digits have been marked, said control switch being operative to operate said switch wipers in forward direction responsive to receipt of a check-back signal and thereafter in reverse direction to prepare for the re-transmission of said stored digits.

4. A toll call district telephone system comprising a toll call-originating exchange, toll call routing switch means in said call-originating exchange having access to trunk lines leading directly to the exchange nearest to the called subscriber and to groups of trunk lines leading to other exchanges, each of said other exchanges having toll call routing switch means which have similar access to similarly directed trunk lines, digit impulse storage means in the call-originating exchange for storing the digits of a called subscriber's line including the digits which designate the district number thereof, means controlled by each toll call routing switch in each exchange for transmitting differentiating check-back signals to the toll call-originating exchange, a control relay responsive to said check-back signals, and means controlled by said control relay for controlling said digit impulse storage means to transmit digits of the called subscriber's line depending on the trunk routes selected in the progressive building up of a toll call.

References Cited in the file of this patent

UNITED STATES PATENTS

| | | |
|---|---|---|
| 2,339,709 | Ostline | Jan. 18, 1944 |
| 2,431,313 | Hertog | Nov. 25, 1947 |
| 2,554,155 | Molnar | May 22, 1951 |
| 2,597,209 | Walsh | May 20, 1952 |
| 2,631,195 | Ostline | Mar. 10, 1953 |